United States Patent [19]

Hofmann

[11] Patent Number: 5,464,903
[45] Date of Patent: Nov. 7, 1995

[54] PROCESS FOR PREPARING ETHYLENE COPOLYMER PLASTICIZED PVC

[75] Inventor: George H. Hofmann, Wilmington, Del.

[73] Assignee: E. I. Du Pont de Nemours and Company, Wilmington, Del.

[21] Appl. No.: 331,842

[22] Filed: Oct. 31, 1994

[51] Int. Cl.$^6$ .......................... C08G 67/02; C08L 27/06; C08L 33/04

[52] U.S. Cl. .......................... 525/185; 525/190; 525/194; 525/222; 525/239

[58] Field of Search ............................ 525/185, 190, 525/194, 222, 239

[56] References Cited

U.S. PATENT DOCUMENTS

| | | | |
|---|---|---|---|
| 3,780,140 | 12/1973 | Hammer | 525/185 |
| 4,172,939 | 10/1979 | Hoh | 528/392 |
| 4,304,887 | 12/1981 | Cohen | 525/329 |
| 4,373,051 | 2/1983 | Memering | 524/524 |
| 4,434,253 | 2/1984 | Rys-Sikora | 521/134 |
| 4,613,533 | 9/1986 | Loomis et al. | 428/36 |
| 4,627,993 | 12/1986 | Loomis | 428/36 |
| 4,699,857 | 10/1987 | Giovannoni et al. | 429/204 |
| 4,739,012 | 4/1988 | Hagman | 525/173 |
| 5,278,236 | 1/1994 | Case et al. | 525/189 |

OTHER PUBLICATIONS

G. H. Hoffman et al., Plasticization of PVC with Polyethylene Copolymer Resins, *Journal of Vinyl Technology*, vol. 16, pp. 16, 17, Mar. 1994.

*Primary Examiner*—Thomas Hamilton, III
*Attorney, Agent, or Firm*—Peter A. Fowell

[57] ABSTRACT

Gel, or unfluxed PVC grains commonly present in PVC plasticized with high molecular weight ethylene copolymer plasticizers, can be reduced by using an improved production process which involves substituting a modifier, which is partially crosslinked high molecular weight ethylene copolymer, for a portion of the non-crosslinked high molecular weight ethylene copolymer plasticizer. Preferably the modifier also contains a small mount of a low molecular weight plasticizer to counteract the effect of viscosity increase which the partially crosslinked ethylene copolymer otherwise would produce.

4 Claims, No Drawings

PROCESS FOR PREPARING ETHYLENE COPOLYMER PLASTICIZED PVC

BACKGROUND OF THE INVENTION

1. Field of the Invention

This invention relates to an improved process to prepare plasticized PVC when plasticized with high molecular weight, ethylene copolymer plasticizers. More particularly, it relates to a process improvement, to reduce gel commonly present, which involves addition of small amounts of partially crosslinked ethylene copolymer modifier to the mix of PVC and the (non-crosslinked) high molecular weight, ethylene copolymer plasticizer. The partially crosslinked ethylene copolymer modifier is based on an ethylene copolymer similar in composition to that of the high molecular weight ethylene copolymer plasticizer. Conventional low molecular weight PVC plasticizers are preferably also present as part of the modifier.

2. Description of Related Art

PVC has been plasticized with so called 'monomeric' and low molecular weight 'polymeric' plasticizers for many years. Low molecular weight 'polymeric' plasticizers are really oligomeric polyester materials which are liquid at ambient temperatures.

Some time ago, certain high molecular weight ethylene copolymer resins were also found to plasticize PVC. Typically, these ethylene copolymers are ethylene/vinyl acetate bipolymers containing a high level of vinyl acetate, and terpolymers of ethylene, vinyl acetate or an alkyl acrylate, and carbon monoxide. The mount of the monomers vinyl acetate or alkyl acrylate in the termonomers is considerably lower than vinyl acetate in the bipolymer because the strongly polar nature of the carbon monoxide enhances miscibility, reducing the other comonomer requirement for miscibility. These ethylene copolymers are soft but essentially non-fluid at ambient temperatures.

The above carbon monoxide containing ethylene terpolymers were first disclosed in U.S. Pat. No. 3,780,140 (Hammer). They are disclosed as useful for blending with PVC and other polymers. Two types of 'compatible' mixtures are described, one where the terpolymer toughens but does not significantly plasticize, the other where the ethylene terpolymer is miscible on a molecular scale and plasticizes, i.e. reduces the modulus, of the PVC or other polymer. The blends claimed were PVC blends. Blend compositions of this type have been commercial for many years. It is this type of plasticized PVC which the improved preparation process of the present invention is concerned with. This patent also discloses the use of mixed high molecular weight and 'monomeric' or low molecular weight oligomeric, liquid plasticizers.

U.S. Pat. No. 5,278,236 (Case et al.) discloses especially useful high molecular weight polymeric plasticizers for PVC which are ethylene/alkyl acrylate/carbon monoxide polymers made under special process conditions which are believed to produce low levels of chain branching. PVC blends with this polymer give smooth surfaces in moldings. Ethylene/n-butyl acrylate/carbon monoxide is especially preferred.

U.S. Pat. No. 4,613,533 (Loomis et al.) discloses partially crosslinked elastomeric compositions which are blends of PVC and ethylene terpolymers containing carbon monoxide. The ethylene terpolymers which become crosslinked are similar to the ones of concern in the present invention. The crosslinking is typically carded out on the PVC blend, though it may be carried out on the ethylene terpolymer before blending with the PVC. Because of the level of crosslinking in the overall blend, and because of the particular phase structure, the product has properties associated with a vulcanized rubber, particularly low compression set. As a result of the level of crosslinking and phase structure also, the compositions typically exhibit no flow in melt index tests. However, because of the phase structure they can be made to flow under certain conditions. Thus they can be melt processed by extrusion, calendering and injection molding. As such these materials fall into the well-known category of thermoplastic elastomers.

U.S. Pat. No. 4,627,993 (Loomis) describes similar elastomeric compositions which are blends of PVC and crosslinked ethylene bipolymer copolymers without carbon monoxide, but higher level of comonomer in the copolymer. The compositions, likewise, typically exhibit no flow, but can be melt processed.

While the blends described in the above two patents are somewhat similar, chemically, to ethylene copolymer plasticized PVC, the presence of crosslinking makes them quite different in their physical behavior. Thus ethylene copolymer plasticized PVC has relatively high melt flow and poor (high) compression set—just the opposite of the Loomis thermoplastic elastomers.

The ethylene copolymer plasticizers themselves, while non-fluid at ambient temperatures, characteristically have low viscosities (corresponding to very high melt flow) at the melt processing temperatures of PVC. PVC has relatively high melt viscosity and hence low melt flow. The amount of plasticizer used in plasticized PVC ensures adequate melt flow, though not as high as the plasticizer itself.

Plasticized PVC is typically made using PVC which is granular, i.e., having relatively small particles. During preparation of ethylene copolymer plasticized PVC, melt-mixing of the relatively low melt viscosity ethylene copolymer plasticizers and the relatively high melt viscosity PVC can present the typical problems associated with mixing high and low viscosity fluids, namely non-uniformity of mixing, absent extremely rigorous mixing conditions. Thus, while plasticization implies miscibility, the ease of achieving completely uniform mixtures is another matter entirely. In fact, unless very high torque is used to provide high shear energy, it is common to have a high number of undissolved (i.e. unmixed or 'unfused' or 'unfluxed') PVC gains or particles. When film is made of the plasticized PVC, the grains appear similar to gel spots common in many polymer films. These particles result in decreased gloss and decreased tensile strength in parts and film made of the plasticized material. Unfortunately, commonly, producer-processors who prepare such plasticized materials have relatively low-intensity mixing equipment, so the problem of undissolved grains of PVC or 'gel' is very common.

One approach to reducing this gel has been simply to use higher viscosity ethylene copolymer plasticizer. This approach is described in an article entitled 'Plasticization of PVC ethylene copolymer resins', published in the Journal of Vinyl Technology, March 1994. However, this is not a totally satisfactory solution, and limits the range of plasticizers which can be used.

There remains a need for a process which can reduce the problem of incipient gel, in plasticized PVC, to enable a wider range of plasticizers, process conditions, and processing equipment to be used, and to allow a wider range of plasticized compositions to be utilized.

SUMMARY OF THE INVENTION

The present invention provides an improved process by which to prepare ethylene copolymer plasticized PVC compositions, which reduces gel. The process provides the ability to use a wider range of process conditions and also allows a wider variety of plasticized compositions to be utilized than heretofore.

In a process to prepare plasticized PVC, wherein PVC is plasticized with a compatible amount, between 20 and 150 parts per 100 parts of PVC, of a primary plasticizer which is an ethylene copolymer having a melt index from 1 to 100, selected from the group consisting of bipolymers of ethylene with vinyl acetate, terpolymers of ethylene with vinyl acetate and with carbon monoxide, and terpolymers of ethylene with a C1–C8 alkyl acrylate and with carbon monoxide, and optionally also plasticized with up to 20 parts per 100 parts of the PVC but fewer parts than the parts of the primary plasticizer, of a first low molecular weight, non-ethylene copolymer, secondary plasticizer, where the process comprises mixing the PVC, the ethylene copolymer primary plasticizer and optional low molecular weight non-ethylene copolymer secondary plasticizer in melt-mixing equipment, the improvement comprises:
substitution of some of the 20–150 parts of primary plasticizer, with a modifier, in an mount from 5–30 of those parts before commencing melt-mixing with the PVC. The modifier comprises:
a) a partially-crosslinked ethylene copolymer, the ethylene copolymer before being crosslinked selected from the group consisting of bipolymers of ethylene and vinyl acetate, terpolymers of ethylene with vinyl acetate and with carbon monoxide, and terpolymers of ethylene with a C1–C8 alkyl acrylate and with carbon monoxide, the level of crosslinking being between 25 and 80 percent;
b) 0–30% of the mount of total modifier a) plus b), of a second low molecular weight, non-ethylene-copolymer plasticizer, which has been added to the ethylene copolymer of the modifier before it is crosslinked.

DETAILED DESCRIPTION OF THE INVENTION

In the following disclosure, the word 'copolymer' means an essentially random copolymer prepared directly from two or more monomers. This is distinct from a graft-copolymer where a monomer or other unit is attached, via polymerization or other means, to an existing polymer chain. If two monomers only are copolymerized the word 'bipolymer' is used if specificity is required. Likewise if three monomers are copolymerized the word 'terpolymer' is used when specificity is required. The phrase copolymer of ethylene 'with' another monomer(s) means the copolymer has units derived from ethylene and the other monomer(s).

Poly(vinyl chloride) polymer, in this disclosure is meant to include the many copolymers of vinyl chloride with other monomers, well known commercially. These polymers are thermally unstable, and it is common to add small mounts of various stabilizers. The term 'PVC', as used in this disclosure, is used generally to mean either the polymer alone or the polymer together with a typical thermal stabilizer package when the distinction is unnecessary in the context. If it is necessary to refer specifically to the unstabilized or stabilized polymer, the terms 'PVC polymer' and 'stabilized PVC' will be used. The term 'stabilized PVC dry blend' means PVC polymer dry blended with a mixture of stabilizers without melting.

The word 'gel' in this disclosure is used to describe the undissolved unmixed or unfluxed PVC grains. The 'gel' particles are not crosslinked. Normally the word 'gel' is used for particles of crosslinked material. Indeed gel is a technical term often used specifically to describe material that comprises a continuous crosslinked network. The word gel is used here merely as a convenience.

PVC is a stiff, somewhat brittle polymer which is commonly plasticized for many end uses. The first plasticizers were liquid, low molecular weight materials, mostly esters, such as phthalate esters (which sometimes, confusingly but commonly, are referred to as 'monomeric') and liquid, low molecular weight (sometimes called 'polymeric') oligomeric polyester materials of varying, often proprietary, composition. Typically their molecular weight is below about 3000. For the purposes of this disclosure these plasticizers, i.e., low molecular weight materials, will be given the general term 'non-ethylene copolymer low molecular weight plasticizers' or 'non-ethylene copolymer plasticizers' or 'low molecular weight plasticizers', whichever is more useful in the context. The three terms as used here, are synonymous in meaning. The term 'polymeric' will not be used, to avoid confusion, because both the liquid oligomeric polyesters, and the non-fluid high molecular weight ethylene copolymer plasticizers can be or have been described as polymeric, yet they are essentially quite different.

As noted above, plasticizers having significant molecular weight later came to be used, and these were the non-fluid ethylene copolymers. These ethylene copolymers can have weight average molecular weights up to about 250,000. They include both bipolymers with vinyl acetate and terpolymers with vinyl acetate or an alkyl acrylate, and with carbon dioxide. Because of their molecular weight they have the advantage of greater permanence in plasticized compositions than compositions using the older low molecular weight plasticizers. However they are not quite as efficient in reducing modulus or stiffness (i.e. plasticizing) on a weight basis as the non-ethylene copolymer plasticizers. In addition, they may not always produce quite as flexible plasticized compositions at lower temperatures though acrylate comonomer in the terpolymer type can help considerably in this respect. Sometimes a compromise is made for both property and cost reasons by using mixtures of both types of plasticizer. Permanence may be reduced somewhat, but still improved over use of only low molecular weight plasticizers. The present invention is concerned with an improvement to the process of plasticizing PVC when plasticized with ethylene copolymers alone, and of plasticizing PVC with a combination of ethylene copolymers and low molecular weight plasticizers.

Plasticizers as the term is generally used, and as is used here, are essentially miscible with the polymer to be plasticized, rather than merely compatible. The term compatible is broader and can include substances which can co-exist as a separate phase such as tougheners etc. as well as truly miscible substances. The high molecular weight ethylene copolymer plasticizers to which this invention pertains, which are miscible with PVC include ethylene/vinyl acetate copolymers having from 55–75 weight percent vinyl acetate, and ethylene/vinyl acetate or C1–C8 alkyl acrylate/carbon monoxide terpolymers having at least 40 weight percent ethylene, 10–50 weight percent vinyl acetate or alkyl acrylate, preferably 20–40 weight percent, and 2–30 weight percent carbon monoxide, preferably 5–15 weight percent.

The C1–C8 refers to the number of carbons in the alkyl group. Preferred alkyl acrylates are n-alkyl acrylates, with 4–8 carbons in the alkyl group, and most preferred is n-butyl acrylate. The broadest ranges of comonomer contents represent the limits for miscibility for the whole family. Of course, for a particular PVC grade, a given melt index, (MI), copolymer and a given comonomer in that copolymer, the precise ranges of comonomer contents which allow miscibility may be narrower than these broad limits. However the preferred ranges of comonomer will generally represent ranges which will always be miscible. It is within the skill of the artisan to map, within the broad range of comonomer contents possible, the precise range which allow complete miscibility at all levels, or the extent of miscibility for the more extreme comonomer limits. The phrase 'miscible amount, between 20 and 150 parts (of plasticizer) per 100 parts of PVC', as used in this disclosure, means an amount falling between the limits shown, which is also miscible.

The MI which the primary plasticizer may have, for which the process of the present invention can be effective is from about 1 to 100 and most preferably from 5 to 50. MIs up to over 2000 will plasticize PVC and can still be considered high molecular weight. As the MI increases however the plastizers can be expected to be increasingly non permanent. Above 100 MI however, the mixing problems are sufficiently severe that they are unlikely to be helped by the improved process of this invention. More severe mixing problems, as the examples below will show, occur more with lower viscosity, higher MI plasticizer. Thus even when the plasticizer has an MI of 28 compared with an MI of 8 more severe problems occur. Higher MI plasticizers are however more effective plasticizers, however and this should be considered in some instances.

Low molecular weight non-ethylene copolymer plasticizers may also be present up to 20 parts per 100 parts of PVC, but not more than equal the number of parts of ethylene copolymer plasticizer. Low molecular weight plasticizers possible include the well known liquid oligomeric polyesters having a molecular weight usually below about 3000. There are many proprietary polyesters of this type on the market. Other plasticizers include those conventionally used for PVC which are esters such as phthalates, adipates, azealates, trimellitates and phosphate esters. An ideal and low cost low molecular weight plasticizer is diisononyl phthalate (D1NP). Generally, the ethylene copolymer plasticizers for PVC will be miscible with non-ethylene copolymer plasticizers for PVC.

When such low molecular weight plasticizer is also present, the problem of poor mixing will be increased as a result of the increased difference in the net viscosity of the plasticizer mix and that of the PVC. The improved process of this invention will therefore be more effective when only primary ethylene copolymer plasticizer is present Nevertheless, improvements can be realized to a mixed plasticizer process. However, as will be described below, low molecular weight plasticizer of exactly the same type is preferably part of the modifier which is the critical element in the process of the invention.

While many granular grades of PVC may be plasticized with low molecular weight plasticizers without melting the PVC, with the ethylene copolymer plasticizers of concern in the process of the invention, it is necessary to mix the PVC and plasticizer above the melt temperature of the PVC. Typically the two are merely mixed together in melt mixing equipment, including batch mixers such as Banbury mixers, kneaders, single and twin screw melt extenders, and Farrell continuous mixers. Commonly, the melt mixing equipment of processors is not particularly high intensity or high shear equipment, and mixing is inadequate.

The gel problem which occurs on mixing will occur to an extent dependent on the mixing conditions. With low intensity (low torque) melt mixing, the problem can be particularly acute. With higher levels of ethylene copolymer primary plasticizer, the problem is also more serious, as is the problem if the primary plasticizer is lower in viscosity. While the problem with some compositions may be overcome with high intensity mixing, or with very extended mixing times, PVC even with stabilizers is subject to degradation with extended time at high temperature, so that extended time of mixing is preferably avoided. The present invention is designed to alleviate the problem even under low intensity mixing and short mixing times.

The solution to the gel problem involves adding (or substituting part of the ethylene copolymer primary plasticizer with) an amount of partially crosslinked high molecular weight ethylene copolymer to the plasticizer mix before melt-mixing with the PVC. The ethylene copolymers used to prepare the partially crosslinked ethylene copolymer are exactly the same copolymers are those which are normally used as the primary plasticizers themselves, that is to say they may be ethylene/vinyl acetate or ethylene/vinyl acetate or alkyl acrylate/carbon monoxide terpolymers. The particular copolymer used for the partially crosslinked ethylene copolymer, however, need not have the same chemical composition as the primary plasticizing copolymer. Thus the primary plasticizer may be ethylene/vinyl acetate bipolymer while the partially crosslinked polymer may be derived from a terpolymer of, say, ethylene, n-butyl acrylate and carbon monoxide.

The amount of crosslinking necessary in the modifier is between 25 and 80%. Below 25% the reduction is gel count is not sufficient. Above 80%, viscosity of the plasticized product will increase unacceptably. The preferred level is between 40 and 60%.

The partially crosslinked ethylene copolymer modifier also plasticizes (reduces the modulus) of PVC when mixed with it, even though it is crosslinked. Furthermore, it is comparable in effectiveness in reducing modulus as noncrosslinked ethylene copolymer plasticizer having a comparable comonomer content. The starting polymer, before crosslinking is, after all, a plasticizer, and the mount of crosslinking is not sufficient to stiffen it enough to detract from its plasticizing effect significantly. For this reason, if a given total mount of plasticizer is used to achieve a required reduction in modulus, and the modifier is similar chemically, (except for the crosslinking), it is convenient merely to reduce the amount of primary plasticizer and replace it with the a comparable mount of modifier.

The possible range of comonomer contents and MI for the starting polymer, before crosslinking, for the partially crosslinked ethylene copolymer are the same as for the plasticizing ethylene copolymer. The chemical composition of the preferred starting polymers are the same as the preferred polymers for plasticizer. Thus the preferred copolymer for preparing the partially crosslinked ethylene copolymer is a terpolymer, and is preferably ethylene/n-butyl acrylate/carbon monoxide. A particularly suitable partially crosslinked copolymer is prepared from an ethylene/ n-butyl acrylate/carbon monoxide terpolymer having 30 weight percent n-butyl acrylate and 10 weight percent carbon monoxide and having an MI of between 5 and 30, and this is also a preferred primary plasticizer for PVC. Of course, if the starting ethylene copolymer for the modifier is quite different in chemical composition from the primary ethylene copolymer plasticizer, and its effectiveness as a plasticizer is different, then a one for one replacement may not produce the same modulus reduction. In this case, for a given modulus reduction, it may be necessary to add either more or less modifier than the amount the primary plasticizer is reduced by. It can be seen that the terms 'substituting' and 'adding' could both be used as alternate ways of describing what is actually done in the process. Thus for a final composition of 100 parts PVC, 80 parts primary plasticizer and 20 parts modifier one can either define the process used to prepare the composition as one where 20 parts modifier have been added to a 100 PVC/80 primary plasticizer composition before mixing followed by mixing, or one where 20 parts primary plasticizer in a 100 PVC/100 primary plasticizer mix are substituted with 20 parts modifier before mixing, followed by mixing. In this disclosure, the term 'substituted' rather than added has been used in describing the process of the invention. The term, as used here, does not of course mean that the primary plasticizer is first put in, then replaced with modifier, or modifier substituted. It merely means that the amount of primary plasticizer in the mix is reduced by the same amount as the amount of modifier added.

The reason why a partially crosslinked ethylene copolymer is capable of eliminating so-called gel particles is unclear. In fact, since crosslinking is normally associated with gel particles in the more normal sense of that word, it is surprising that adding a partially crosslinked material does not have a detrimental effect.

Preparation of ethylene/vinyl acetate copolymers are well known in the art. Preparation of terpolymers of the type suitable in this invention is described in U.S. Pat. No. 3,780,140 which is hereby incorporated by reference.

It was noted above that the partially crosslinked ethylene copolymer modifier advantageously has a modest amount of low molecular weight plasticizer mixed with it, despite the fact that the presence of low molecular weight plasticizer in the plasticizer mix per se can have a detrimental effect on the level of gel. This low molecular weight plasticizer is actually mixed with the ethylene copolymer base of the modifier before it is partially crosslinked.

There are two reasons why low molecular weight plasticizer is preferably part of the modifier. The first, which relates particularly to why the plasticizer is added to the base ethylene copolymer before crosslinking, is that it appears that the resultant crosslinked polymer appears to become more uniformly crosslinked. When low molecular weight plasticizer is not present, the resulting modifier gives a slight 'gritty' quality to blends with PVC. While not committing to any particular reason, this may be related to small amounts of gel in the classical sense of the word, i.e. areas of highly crosslinked material. The second reason is because, while the partially crosslinked ethylene copolymer plasticizes as far as product modulus is concerned, alone it will increase the product viscosity, particularly if the crosslink level is high. Thus while high crosslink levels, when the crosslinking is uniform, may be more effective in effecting gel reduction, they have the disadvantage of producing larger viscosity increases in the low-gel plasticized product. Low molecular weight plasticizer has the effect of being able to largely cancel out this increase. From the standpoint of convenience for the producer-processor, a modifier which does not change viscosity when substituted for a comparable amount of primary plasticizer is a great convenience, so the final product processes in the same way as it otherwise would. Otherwise, he might have to start experimenting with adding low molecular weight plasticizer in various levels, until he finds an amount which just counteracts the viscosity-increasing effect of partially crosslinked ethylene copolymer modifier alone. Such a 'mixed' modifier can form a sort of 'prepackaged' substitute plasticizer.

The low molecular weight plasticizer which can form part of the modifier, can be present at up to 30 weight percent of total modifier, preferably it is present from 10 to 20 percent. As an example of a modifier which produces minimal effect on the viscosity of the final plasticized PVC when it replaces an equal amount of primary plasticizer, a modifier which has a 40–60% partially crosslinked ethylene copolymer component and 15 parts of DINP low molecular weight plasticizer, is ideal. Higher levels of crosslinking will require higher levels of low molecular weight plasticizer for the modifier to have minimal effect on viscosity of plasticized product. The amount of low molecular weight plasticizer in the modifier required for the modifier to have minimal effect on the viscosity of the final plasticizer product, for any given level of modifier crosslinking may readily be determined by trial and error.

If low molecular weight plasticizer is a component of the modifier, and the process in which an improvement (lowering) of gel level is sought is one where a secondary low molecular weight plasticizer is used together with primary plasticizer in order to obtain some specific balance of product properties, then the final composition will have a low molecular weight nonethylene copolymer as part of the plasticizer mix per se, and another low molecular weight plasticizer component as part of the modifier. (The two low molecular weight plasticizers may be the same or different). Under such circumstances, it may be preferable to reduce the amount of low molecular weight secondary plasticizer, since the properties sought by use of low molecular weight plasticizer will be generated to some extent by its presence in the modifier. An excessive amount of total low molecular weight plasticizer will inevitably reduce the permanence of the total plasticizer, but low levels will have only a moderate effect in this regard.

The level of crosslinking in the modifier may be from 25 to 80%. Preferably it is from 40 to 60%. The higher the level, the more effective in reducing gel in product film, but also the more viscosity is increased in the plasticized product.

Test Methods

Various test methods are used on materials themselves, and in evaluating the product of the process of this invention.

Melt Index, MI, is measured using ASTM D-1238, condition E, at 190 deg. C. using a load of 2160 grams.

Inherent Viscosity, IV, for the PVC refers to the IV measured on the polymer before the PVC 'dry blend' with stabilizers is made. It is measured using ASTM D1243-66T. The value quoted in the examples is the manufacturer's number.

Rheology is measured using conventional piston rheology, using a constant rate GOTTFERT Rheograph 2001 rheometer, with an L/D of 20/1, at 190 deg. C.

Stabilized PVC dry blend used in testing was prepared by mixing PVC polymer, grade VISTA 5303 manufactured by Vista Chemical Co., and adding the following amounts of the following stabilizers per 100 parts of PVC-polymer: 3 parts of MARK 1900 (an alkyl tin mercaptide manufactured by Argus Chemical), 0.4 parts of DLTDP (dilauryl thiodipropionate) and 0.4 parts of IRGANOX 10 10, a hindered phenol antioxidant manufactured by Ciba-Geigy. The IV of the PVC polymer itself was 0.73.

Gel counts were obtained by pressing 2-3 grams of plasticized material between KAPTON film, using Chrome plates, to obtain a film of about 5 mil thickness, and then counting gel particles using a microfiche reader. Numbers represent average gel particles per field of view. An 18× magnification was used, and the field of view represents an area of 4 sq.cm. The average is for at least 3 field of view counts. (In order to make counting of gel particles easier, it is possible to add a small amount of calcium carbonate during preparation of the sample, to provide contrast between gel particles and background during microfiche observation, and this was sometimes done. Its presence has little or no effect on the count).

Torque at equilibrium was determined using a HAAKE System 90 Rheocord Mixer.

The amount of crosslinking in the modifier was determined as follows. A weighed sample, about 1 gram, of the modifier was placed in 100 ml of methyl ethyl ketone and refluxed for 3 hours. About 30 ml. were removed and centrifuged at 14,000 rpm for 20 minutes. An aliquot of 10 ml. of the solution was removed and placed in a tared aluminum pan. The sample was air dried in a hood overnight and then in a 104 deg. C. vacuum oven for one hour, cooled and weighed to determine the weight of solubles. Total weight of solubles for the 100 ml solution is 10 times weighed solubles in the 10 ml aliquot. Weight of insolubles, which is the weight of gel, is the sample weight less the weight of solubles. Percent gel is calculated based on the amount of polymer in the sample, i.e. weight of sample less weight of any low molecular weight plasticizer.

The modifier used in the examples was prepared in the following way. Pellets of ethylene/n-butyl acrylate/carbon monoxide (60/30/10 by weight), and an MI of 8 were coated by drum tumbling with 0.50 weight percent of LUPERSOL 23 1 which is an 80% mixture of 1,1-bis(t-butylperoxy)-3,3,5-trimethylcycohexane in butylbenzyl phthalate. The peroxide crosslinking catalyst-coated polymer was fed into a 46 min. BUSS kneader at a rate of about 50 pph. The kneader had a length of 560 mm. DINP plasticizer was fed into the barrel of the kneader at a distance of approximately 200 cm. from the pellet feed port, at a rate to give a 15% loading of DINP in the final product. Zone temperature settings were at 160 deg. C., screw temperature was 100 deg. C., and screw speed was 300 rpm. Melt temperature at the above feed rates reached between 200 and 250 deg. C. The amount of crosslinking was determined to be 44%.

EXAMPLES

Example 1

Samples were prepared by blending the ingredients in a HAAKE System 90 Rheocord mixer, at 190 deg. C for 2.5 minutes. The amount of each ingredient in a sample was adjusted so that the total volume of the sample produced was 40 cc. By keeping the mixing time and volume constant, each sample would have a controlled amount of energy input per unit volume of material. Samples of each of a set of fifteen compositions, shown in Table 1, was prepared at a roller blade speed of 60 rpm. Samples of the same set of fifteen compositions were also prepared at 120 rpm. Samples of nine of the fifteen compositions were also prepared at 90 rpm. Thus 39 samples were prepared in all.

Each of the fifteen compositions in the set, shown in the table, is a blend of stabilized PVC dry blend (i.e. PVC polymer dry blended with stabilizers, described above), ethylene terpolymer primary plasticizer and/or modifier. Values shown represent parts of these ingredients, by weight. The set of fifteen compositions consists of five subsets (A, B, C, D and E), each with a different total level of total primary plasticizer plus modifier. Within each subset there are three compositions, the first having only primary plasticizer, and in the other two, different amounts of modifier replacing an equal amount of primary plasticizer. To calculate the actual weight of each ingredient to be put in the mixer, the total weight required to make a total of 40 cc. is first calculated. This is equal to the sum of [weight fraction of each ingredient (number of parts/total parts, as shown in the table)×specific gravity of that ingredient]×40. The weight of each ingredient is then the weight fraction× total weight.

The terpolymer was an ethylene/n-butyl acrylate/carbon monoxide polymer having a 60/30/10 monomer weight ratio, and an MI of 8. The modifier consists of the same polymer containing 15 weight percent DINP, crosslinked to about 44%. It s preparation is described above.

Gel counts are shown in Table 2. Values of 100 mean 100 or more. Other values represent actual count.

Torque values on samples prepared at 60 rpm, where the modifier is most effective, are shown in Table 3.

Rheology, in terms of viscosity at a given shear rate is shown in Table 4., for samples prepared at 120 rpm, where there was no gel. Gel tends to interfere with viscosity measurement, and values would be unreliable.

Table 2 shows clearly the increasing problem with gel particles at higher loadings of plasticizer (higher rows). It also shows that the problem can be alleviated by mixing at higher rpm. At 120 rpm there is no gel problem at all (left columns). However, as noted, the problem is how to reduce gel where it occurs significantly, i.e. at lower rpm. corresponding to lower intensity mixing (right columns). It can be seen that by replacing primary plasticizer with increasing modifier, gel particles decrease, except when the level of total additive is very high (right column, top five rows still maintain a gel count of 100).

Values for the torque required to prepare samples at 60 rpm, where the problem of gel is significant, shown in Table 3, indicate torque is not significantly increased as primary plasticizer is partially replaced by modifier.

Viscosity values in Table 4, clearly indicate very little difference in total rheology (i.e. throughout the shear rate range), as primary plasticizer is partially replaced by modifier.

It can be seen therefore, that with the compositions considered, with low and moderate intensity mixing where the gel problems are significant, replacement of primary plasticizer with modifier can significantly decrease gel level.

Example 2

In this example, composition were made where the primary plasticizer was an ethylene/vinyl acetate/carbon monoxide terpolymer having a higher MI (lower viscosity) than that of the n-butyl acrylate terpolymer primary plasticizer of example 1, mixing for 2.5 minutes. MI was 28 compared with 8. Monomer weight ratio was the same, i.e. 60/30/10. The modifier is the same as in Example 1 and so was the PVC. The same method of blending was used. Compositions are shown in Table 5. Measured gel counts are shown in Table 6, and torque in Table 7. Apparent viscosity, shown in Table 8, was measured on samples prepared at 60 rpm but in this case after mixing for extended times until equilibrium torque was reached (about 5 to 8 minutes) and no gel was present.

Table 6 shows that when lower viscosity terpolymer used (higher MI of 25 in this example versus 8 for example 1 ), there is more of a problem with gel. Thus, even with high intensity mixing, using 120 rpm, gel particles occur, in contrast to the terpolymer of example 1, where no gel occurred at 120 rpm. It is believed that different chemical composition of the terpolymer per se (i.e. vinyl acetate terpolymer compared with n-butyl acrylate terpolymer of Example 1) has little effect on the gel level, and that the amount of gel is related only to the viscosity of the plasticizer. Substituting modifier reduces gel where problems occur at this high rpm mixing. At the low rpm of 60, where the problem is always more severe, gel is reduced only at lower levels of total primary plasticizer plus modifier. Nevertheless, overall, it is clear that presence of modifier can significantly reduce gel, but to a lesser extent where high plasticizer level, lower viscosity plasticizer, and low intensity mixing exist. Possibly higher levels of modifier would be suitable in reducing gel, even under such conditions.

Table 7 shows the level of torque at equilibrium, at 60 rpm. There is a slight increase in torque at lower total plasticizer plus modifier levels when modifier replaces primary plasticizer, but overall the increase is not considered significant.

Table 8 shows rheological behavior with and without modifier. Except at low shear and low total additive levels (lower than would normally be used in typical plasticized compositions), there is little difference in rheology when modifier replaces primary plasticizer. Even here however, where there is a 30% increase in viscosity (6495 v 4973 Pa.S for compositions 5E versus 4E), it is not considered significant. The reason is clearly that one is substituting a higher viscosity modifier for a lower viscosity (MI 28) plasticizer. In example 1, a higher viscosity resin (MI 8) was replaced, and so the contrast in viscosity would be expected to be less.

In general, a slightly higher level of low molecular weight plasticizer in the modifier could counteract the slight increase in viscosity of the product observed at low shear if this was deemed detrimental to its processability.

These examples illustrate the product properties in a process carded out in a HAAKE mixer. Each mixing device will have its own range of intensity of mixing. Thus, for instance, some extenders equipped with high shear screws may present no problem with product gel, but many extruders which have only moderate intensity mixing ability will produce gel problems amenable to the solution described in this invention.

TABLE 1

PLASTICIZED PVC BLEND COMPOSITIONS (Ex. 1)

| Composition No. | Parts: PVC | Parts: Primary Plasticizer | Parts: Modifier |
|---|---|---|---|
| 1A | 100 | 100 | 0 |
| 2A | 100 | 90 | 10 |
| 3A | 100 | 80 | 20 |
| 1B | 100 | 80 | 0 |
| 2B | 100 | 70 | 10 |
| 3B | 100 | 60 | 20 |
| 1C | 100 | 60 | 0 |
| 2C | 100 | 50 | 10 |
| 3C | 100 | 40 | 20 |
| 1D | 100 | 40 | 0 |
| 2D | 100 | 30 | 10 |
| 3D | 100 | 20 | 20 |
| 1E | 100 | 20 | 0 |
| 2E | 100 | 10 | 10 |
| 3E | 100 | 0 | 20 |

TABLE 2

SAMPLE GEL COUNT (Ex. 1)

| Sample | Count | Sample | Count | Sample | Count |
|---|---|---|---|---|---|
| 1A @ 120 rpm | 0 | 1A @ 90 rpm | 37 | 1A @ 60 rpm | 100 |
| 2A @ 120 rpm | 0 | 2A @ 90 rpm | 12 | 2A @ 60 rpm | 100 |
| 3A @ 120 rpm | 0 | 3A @ 90 rpm | 6 | 3A @ 60 rpm | 100 |
| 1B @ 120 rpm | 0 | 1B @ 90 rpm | 15 | 1B @ 60 rpm | 100 |
| 2B @ 120 rpm | 0 | 2B @ 90 rpm | 4 | 2B @ 60 rpm | 100 |
| 3B @ 120 rpm | 0 | 3B @ 90 rpm | 1 | 3B @ 60 rpm | 8 |
| 1C @ 120 rpm | 0 | 1C @ 90 rpm | 1 | 1C @ 60 rpm | 100 |
| 2C @ 120 rpm | 0 | 2C @ 90 rpm | 0 | 2C @ 60 rpm | 35 |
| 3C @ 120 rpm | 0 | 3C @ 90 rpm | 0 | 3C @ 60 rpm | 1 |
| 1D @ 120 rpm | 0 | | | 1D @ 60 rpm | 8 |
| 2D @ 120 rpm | 0 | | | 2D @ 60 rpm | 1 |
| 3D @ 120 rpm | 0 | | | 3D @ 60 rpm | 1 |
| 1E @ 120 rpm | 0 | | | 1E @ 60 rpm | 2 |
| 2E @ 120 rpm | 0 | | | 2E @ 60 rpm | 0 |
| 3E @ 120 rpm | 0 | | | 3E @ 60 rpm | 0 |

TABLE 3

TORQUE AT EQUILIBRIUM
FOR SAMPLES PREPARED AT 60 RPM (Ex. 1)

| Sample | Torque (m-gm) |
|---|---|
| 1A | 635 |
| 2A | 682 |
| 3A | 704 |
| 1B | 718 |
| 2B | 718 |

TABLE 3-continued

TORQUE AT EQUILIBRIUM
FOR SAMPLES PREPARED AT 60 RPM (Ex. 1)

| Sample | Torque (m-gm) |
|---|---|
| 3B | 744 |
| 1C | 763 |
| 2C | 820 |
| 3C | 826 |
| 1D | 844 |
| 2D | 809 |
| 3D | 852 |
| 1E | 848 |
| 2E | 831 |
| 3E | 826 |

TABLE 4

RHEOLOGY: VISCOSITY @ CONSTANT SHEAR RATE
FOR SAMPLES PREPARED AT 120 RPM (Ex. 1)

| Sample | Viscosity (Pa · S) | | | | | |
|---|---|---|---|---|---|---|
| @ Shear Rate (sec −1): | 10 | 100 | 300 | 900 | 2000 | 3500 |
| 1A | 2841 | 1038 | 591 | 304 | 177 | 119 |
| 2A | 2902 | 1014 | 576 | 302 | 177 | 118 |
| 3A | 2841 | 1000 | 573 | 302 | 177 | 118 |
| 1C | 3988 | 1372 | 758 | 383 | 217 | 143 |
| 2C | 4080 | 1359 | 760 | 376 | 215 | 142 |
| 3C | 4080 | 1377 | 756 | 386 | 220 | 146 |
| 1E | 6922 | 2114 | 1172 | 534 | 292 | 190 |
| 2E | 6820 | 2052 | 1131 | 531 | 293 | 190 |
| 3E | 7378 | 2246 | 1149 | 547 | 304 | 195 |
| PVC | 9703 | 2694 | 1290 | 657 | 336 | 202 |
| Primary plasticizer | 1278 | 467 | 260 | 139 | 85 | 60 |
| Modifier | 4333 | 870 | 415 | 192 | 111 | 76 |

TABLE 5

PLASTICIZED PVC BLEND COMPOSITIONS (Ex. 2)

| | | Parts: | |
|---|---|---|---|
| Composition # | PVC | Primary plasticizer | Modifier |
| 4A | 100 | 100 | 0 |
| 5A | 100 | 80 | 20 |
| 4B | 100 | 80 | 0 |
| 5B | 100 | 60 | 20 |
| 4C | 100 | 60 | 0 |
| 5C | 100 | 40 | 20 |
| 4D | 100 | 40 | 0 |
| 5D | 100 | 20 | 20 |
| 4E | 100 | 20 | 0 |
| 5E | 100 | 0 | 20 |

TABLE 6

SAMPLE GEL COUNT (Ex. 2)

| Sample | Count | Sample | Count |
|---|---|---|---|
| 4A @ 120 rpm | 40 | 4A @ 60 rpm | 100 |
| 5A @ 120 rpm | 14 | 5A @ 60 rpm | 100 |
| 4B @ 120 rpm | 16 | 4B @ 60 rpm | 100 |
| 5B @ 120 rpm | 2 | 5B @ 60 rpm | 100 |
| 4C @ 120 rpm | 5 | 4C @ 60 rpm | 100 |
| 5C @ 120 rpm | 1 | 5C @ 60 rpm | 37 |
| 4D @ 120 rpm | 1 | 4D @ 60 rpm | 100 |
| 5D @ 120 rpm | 3 | 5D @ 60 rpm | 31 |
| 4E @ 120 rpm | 0 | 4E @ 60 rpm | 52 |
| 5E @ 120 rpm | 0 | 5E @ 60 rpm | 6 |

TABLE 7

TORQUE AT EQUILIBRIUM FOR
SAMPLES PREPARED AT 60 RPM (Ex. 2)

| Sample | Torque (m-gm) |
|---|---|
| 4A | 448 |
| 5A | 480 |
| 4B | 522 |
| 5B | 522 |
| 4C | 527 |
| 5C | 591 |
| 4D | 565 |
| 5D | 698 |
| 4E | 714 |
| 5E | 847 |

TABLE 8

RHEOLOGY: VISCOSITY @ CONSTANT SHEAR RATE
FOR SAMPLES PREPARED AT 60 RPM (Ex. 2)

| Sample | Viscosity (Pa · S) | | | | | |
|---|---|---|---|---|---|---|
| @ Shear Rate (sec −1): | 10 | 100 | 300 | 900 | 2000 | 3500 |
| 4A | 1431 | 655 | 414 | 233 | 143 | 98 |
| 5A | 1563 | 730 | 455 | 245 | 148 | 100 |
| 4B | 1877 | 808 | 488 | 265 | 160 | 107 |
| 5B | 2111 | 894 | 522 | 279 | | |
| 4C | 2354 | 986 | 578 | 315 | 182 | 120 |
| 5C | 3004 | 1146 | 661 | 339 | 195 | 128 |
| 4D | 3572 | 1326 | 767 | 380 | 214 | 137 |
| 5D | 4019 | 1494 | 816 | 398 | 219 | 142 |
| 4E | 4973 | 1738 | 941 | 458 | 247 | 156 |
| 5E | 6495 | 2107 | 1090 | 508 | 280 | 181 |
| Primary Plasticizer (E/VA/CO) | 244 | 212 | 141 | 88 | 60 | 45 |

I claim:

1. In a process to prepare plasticized PVC, wherein PVC is plasticized with a miscible amount, between 20 and 150 parts per 100 parts of PVC, of a primary plasticizer which is an ethylene copolymer having a melt index of from 1 to 100, selected from the group consisting of bipolymers of ethylene with vinyl acetate, terpolymers of ethylene with vinyl acetate and with carbon monoxide, and terpolymers of ethylene with a C1–C8 alkyl acrylate and with carbon monoxide, and optionally also plasticized with up to 20 parts per 100 parts of the PVC but fewer parts than the parts of the primary plasticizer, of a first low molecular weight, non-ethylene copolymer secondary plasticizer, the process comprising mixing the PVC, the ethylene copolymer primary plasticizer and optional secondary plasticizer in melt-mixing equipment, the improvement comprising:
substitution of some of the 20–150 parts of primary plasticizer, with a modifier, in an amount from 5–30 of those parts before commencing melt-mixing with the PVC, the modifier comprising:
a) a partially-crosslinked ethylene copolymer, the ethylene copolymer before being crosslinked selected from the group consisting of bipolymers of ethylene and vinyl acetate, terpolymers of ethylene with vinyl acetate and with carbon monoxide, and terpolymers of ethylene with a C1–C8 alkyl acrylate and with carbon monoxide, the level of crosslinking being between 25 and 80 percent;
b) 0–30 percent of the total modifier a) plus b), of a second low molecular weight, non-ethylene copolymer plasticizer which is added to the ethylene copolymer of the modifier before crosslinking.

2. The process of claim 1 wherein component a) of the modifier is a partially crosslinked ethylene copolymer terpolymer.

3. The process of claim 1 wherein the modifier also contains from 10 to 30 weight percent of non-ethylene copolymer plasticizer.

4. The process of claim 1 wherein the level of crosslinking in the modifier is from 40 to 60 percent.

* * * * *